(12) United States Patent
Lindeman et al.

(10) Patent No.: US 8,775,320 B1
(45) Date of Patent: Jul. 8, 2014

(54) REDISTRIBUTION OF RIGHTS-MANAGED CONTENT AND TECHNIQUE FOR ENCOURAGING SAME

(75) Inventors: Thomas K. Lindeman, Redmond, WA (US); Scott M. Hanan, Sammamish, WA (US); John Beezer, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 446 days.

(21) Appl. No.: 11/677,315

(22) Filed: Feb. 21, 2007

Related U.S. Application Data

(62) Division of application No. 10/326,678, filed on Dec. 20, 2002, now Pat. No. 7,370,017.

(51) Int. Cl.
| | |
|---|---|
| *G06F 21/00* | (2013.01) |
| *G06F 21/10* | (2013.01) |
| *G06Q 30/06* | (2012.01) |
| *G11B 20/00* | (2006.01) |
| *G06Q 20/12* | (2012.01) |

(52) U.S. Cl.
CPC ............ *G06F 21/10* (2013.01); *G06Q 30/0613* (2013.01); *G11B 20/00086* (2013.01); *G06Q 20/1235* (2013.01)
USPC ............... 705/59; 705/51; 705/54; 705/57

(58) Field of Classification Search
CPC ............... G06F 21/10; G06Q 30/0613; G06Q 20/1235; G11B 20/00086
USPC .......................... 705/51, 54, 57, 59
See application file for complete search history.

(56) References Cited

U.S. PATENT DOCUMENTS

| | | | | |
|---|---|---|---|---|
| 5,375,240 | A | 12/1994 | Grundy | 395/700 |
| 5,537,314 | A * | 7/1996 | Kanter | 705/14.13 |
| 5,629,980 | A | 5/1997 | Stefik et al. | 380/4 |
| 5,864,620 | A | 1/1999 | Pettit | |
| 5,892,900 | A | 4/1999 | Ginter et al. | 395/186 |
| 5,987,429 | A * | 11/1999 | Maritzen et al. | 705/31 |
| 5,999,914 | A * | 12/1999 | Blinn et al. | 705/26.8 |
| 6,233,684 | B1 * | 5/2001 | Stefik et al. | 713/176 |
| 6,282,653 | B1 | 8/2001 | Berstis et al. | |
| 6,334,111 | B1 * | 12/2001 | Carrott | 705/14.39 |

(Continued)

OTHER PUBLICATIONS

"Amway: Business Opportunity" Nov. 27, 2001. All pages. Amway homepage. Retrieved via Wayback Machine on Jul. 18, 2010. <http://web.archive.org/web/20011127132451/www.amway.com/businessopp/b-howIStar.asp>.*

(Continued)

*Primary Examiner* — Calvin Cheung
(74) *Attorney, Agent, or Firm* — Ben Tabor; Kate Drakos; Micky Minhas

(57) ABSTRACT

Use of rights-managed content is enabled by a digital license that includes the identity of the licensee. The licensee redistributes the content by sending a package containing the content and the license to another party. That other party obtains a license to use the content by contacting a license server, and preferably pays a fee for this license. During the contact with the license server, the licensee's identifying information is uploaded to the license server, which allows the license server to determine who distributed the content to the other party. The license server can use this information to reward the original licensee for having redistributed the content.

18 Claims, 5 Drawing Sheets

(56) References Cited

U.S. PATENT DOCUMENTS

| | | | |
|---|---|---|---|
| 6,363,356 B1* | 3/2002 | Horstmann | 705/26.7 |
| 6,446,044 B1* | 9/2002 | Luth et al. | 705/14.16 |
| 6,912,514 B2* | 6/2005 | Matsushima et al. | 705/52 |
| 7,039,605 B2* | 5/2006 | Kuwahara et al. | 705/26 |
| 7,149,722 B1* | 12/2006 | Abburi | 705/59 |
| 7,209,892 B1* | 4/2007 | Galuten et al. | 705/26 |
| 7,310,629 B1* | 12/2007 | Mendelson et al. | 1/1 |
| 7,574,488 B2* | 8/2009 | Matsubara | 709/219 |
| 7,631,318 B2* | 12/2009 | Cottrille et al. | 719/328 |
| 7,844,549 B2* | 11/2010 | Strickland | 705/59 |
| 8,001,052 B2* | 8/2011 | Dunkeld et al. | 705/51 |
| 2001/0020231 A1* | 9/2001 | Perri et al. | 705/14 |
| 2001/0034635 A1* | 10/2001 | Winters | 705/10 |
| 2001/0051925 A1* | 12/2001 | kang | 705/51 |
| 2002/0042733 A1* | 4/2002 | Lesandrini et al. | 705/10 |
| 2002/0049792 A1* | 4/2002 | Wilcox et al. | 707/522 |
| 2002/0069116 A1* | 6/2002 | Ohashi et al. | 705/26 |
| 2002/0112243 A1 | 8/2002 | Hunter et al. | |
| 2002/0123956 A1* | 9/2002 | Galuten | 705/37 |
| 2002/0133465 A1* | 9/2002 | Stefik et al. | 705/51 |
| 2002/0138291 A1 | 9/2002 | Vaidyanathan et al. | |
| 2002/0138439 A1 | 9/2002 | Matsushima et al. | |
| 2002/0152163 A1* | 10/2002 | Bezos et al. | 705/40 |
| 2002/0178054 A1* | 11/2002 | Ader | 705/14 |
| 2003/0018582 A1 | 1/2003 | Yaacovi | |
| 2003/0097299 A1* | 5/2003 | O'Kane et al. | 705/14 |
| 2003/0204723 A1* | 10/2003 | Narin et al. | 713/165 |
| 2004/0015423 A1 | 1/2004 | Walker et al. | |
| 2004/0024652 A1* | 2/2004 | Buhse et al. | 705/26 |
| 2004/0059683 A1* | 3/2004 | Epstein et al. | 705/64 |
| 2004/0093273 A1 | 5/2004 | Laurent et al. | |
| 2005/0021398 A1* | 1/2005 | McCleskey et al. | 705/14 |
| 2009/0259847 A1* | 10/2009 | Li | 713/168 |

OTHER PUBLICATIONS

In the United States Patent and Trademark Office, Final Office Action in re:. U.S. Appl. No. 11/677,290, filed Feb. 21, 2007, Dated Sep. 25, 2008, 16 pages.

Konstantas, D. et al., "Trading digital intangible goods: the rules of the game", Proceedings of the 33$^{rd}$ Hawaii International Conference on System Sciences, 2000, 10, 1-10.

Mori, R. et al., "Superdistribution: An Electronic Infrastructure for the Economy of the Future", Transactions of Information Processing Society of Japan, 1997, 38(7), 1465-1472.

Mori, R. et al., "Superdistribution: The Concept and the Architecture", Transactions of the Institute of Electronics, 1990, 73(7), 1133-1146.

Ohtaki, Y. et al., "Protecting User's Privacy while Collecting Usage Records on Superdistribution", Transactions of Information Processing Society of Japan, 2000, 41(11), 2978-2984.

Suematsu, T., "An SD System based on SD Label Distribution Which Is Able to Protect User Privacy", Electronics and Communications in Japan, Part 3, 2000, 83(7), 22-31.

* cited by examiner

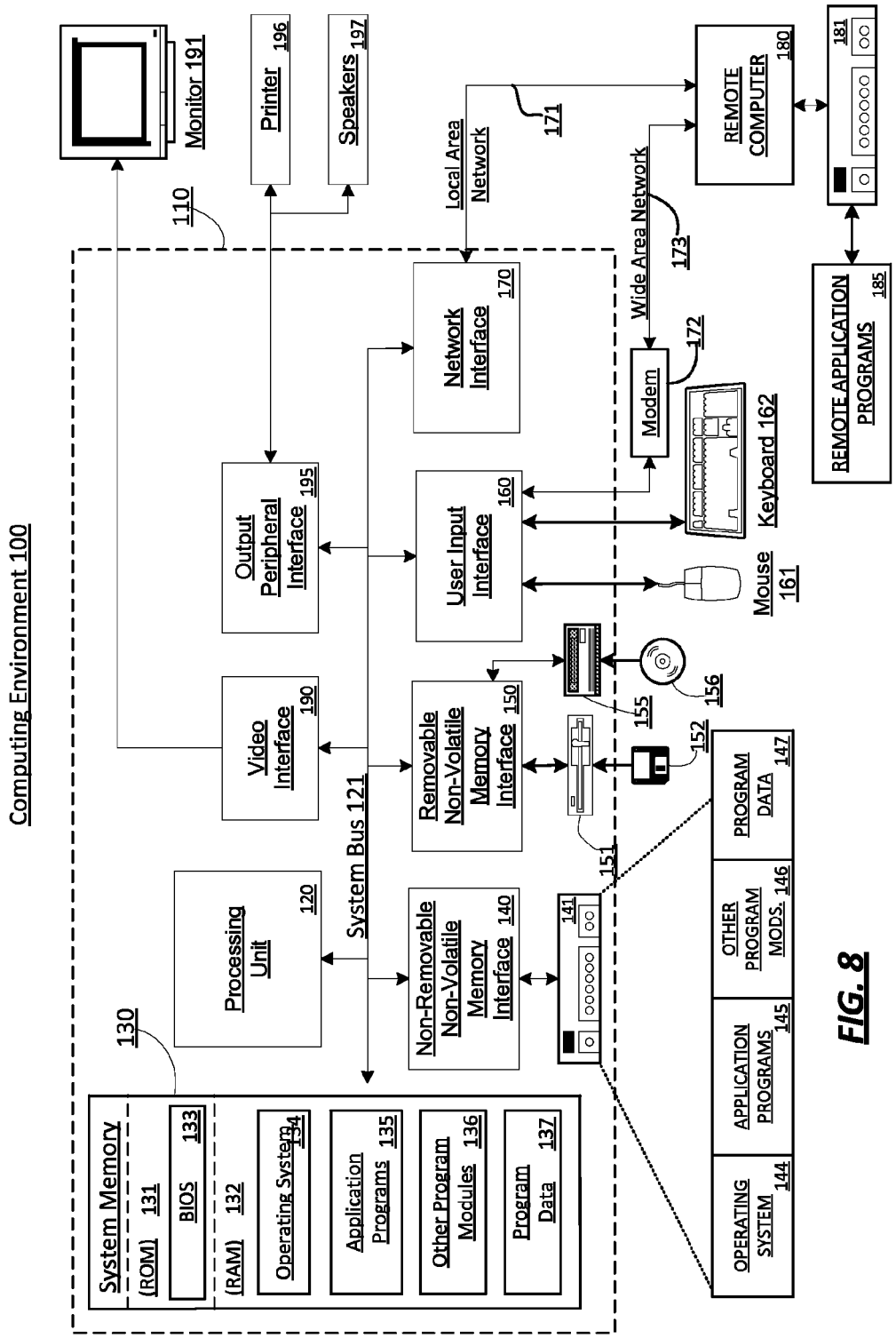

REDISTRIBUTION OF RIGHTS-MANAGED CONTENT AND TECHNIQUE FOR ENCOURAGING SAME

CROSS-REFERENCE TO RELATED CASES

This is a division of U.S. patent application Ser. No. 10/326,678, entitled "Redistribution of Rights-Managed Content and Technique for Encouraging Same," filed Dec. 20, 2002.

FIELD OF THE INVENTION

The present invention relates generally to the field of digital rights management. More particularly, the invention provides a technique for encouraging users to redistribute rights-managed content.

BACKGROUND OF THE INVENTION

Much valuable information content—e.g., copyrighted music, videos, text, software, etc.—is available in digital form. Storing content in electronic digital form offers a number of advantages, such as wide availability of distribution channels, wide availability and low cost of storage media, and the ability to render digital content in high-quality. However, electronic digital content suffers from the disadvantage that high-quality illegal copies can easily be made with little skill or effort. Thus, unauthorized copying of valuable digital content has become a significant problem. Millions of users share unlicensed, non-revenue generating digital assets via peer-to-peer networks and other means, and the phenomenon is growing.

It is unlikely that any law or technology will be completely effective in stopping this trend. Law enforcement does not have the resources to monitor every environment in which illegal copying could take place. Every existing technology that has sought to prevent illegal copying has eventually been broken. Given sufficient time and motivation, a skilled hacker can find a weakness in almost any technology. Since copy-protection technology is generally employed to protect information that has a high economic value, there is no shortage of motivation to break a copy protection technology.

If copy-protection technologies can be broken, and if law enforcement cannot effectively prevent copying, then a better approach to the prevention of illegal copying is to provide a system that gives users an incentive to participate lawfully in the distribution and licensure of content. The possibility that a copy protection technology can be broken is less of a concern if a user has more to gain by participating in the distribution scheme for content than he does by circumventing that scheme. By providing such an incentive, much illegal copying is averted and wider distribution (and purchase) of the content is encouraged.

The present invention provides a system and method for encouraging users to handle content lawfully and to participate in the distribution of that content, and provides advantages that have not been realized in the prior art.

SUMMARY OF THE INVENTION

The invention provides a technique that encourages distribution of content by users, while allowing content owners to be paid for the use of the content. In essence, the technique encourages the purchase of licenses to use electronic content by allowing users to profit from the lawful distribution of content that they have licensed.

In accordance with the invention, content owners (e.g., publishers, bands, etc.) provide high quality, approved, licensed music online for download and sharing. Initially, each piece of content preferably has a digitally signed rights label which specifies the rights in the content that can be licensed to a user, and may also specify limited rights that the user can exercise before purchasing a license (e.g. a song may have two free plays, a 30 second preview, etc.). Each time a new license is created, the user's name is preferably embedded in the license, and this license travels with the content when it is shared. By this mechanism, it is possible to track who distributed a given copy of the content, and to pay that person (or entity) a bounty or referral fee. This bounty could be money, points, t-shirts, etc., and it can go as many "levels" deep as make sense for a given business model—i.e., all users in the chain of distribution leading up to a new licensee can be paid a bounty, or the bounty could be paid only the n most recent users in that chain. Thus, users will have to decide what music they really like and want to keep, can still share music, and have an opportunity to generate enough money to pay for the music they bought. In the end, users can enjoy infinite selection, instant gratification, and legal sharing of approved, high quality, licensed content.

The foregoing technique may be further generalized by allowing an arbitrary "benefit specification" to be bound to the content. Embedding the user's name in a license that travels with the content is an example of binding an implicit benefit specification to that content—i.e., it is implied that all prior licensees (or the n most recent licensees) are entitled to receive a benefit if they participate in the chain of distribution of a piece of content that ultimately leads to the purchase of a license for that content. However, it is also possible to embed in the license (or otherwise associate with the content) an explicit specification of arbitrary rules about how to compensate people who have handled the content in the distribution chain for their participation in that distribution chain (e.g., it may be desirable to allow the original user to embed a rule that states that he gets $3 from any licensing transaction that can be traced through any number of distributors back to his copy). The invention is sufficiently flexible to accommodate a variety of different business models regarding the manner in which users are to be paid for their participation in distributing and redistributing a given piece of content.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings:

FIG. 8 is a block diagram of an exemplary computing environment in which aspects of the invention may be implemented.

DETAILED DESCRIPTION OF THE INVENTION

Overview

The present invention provides a technique for encouraging the distribution and licensure of rights-managed content by allowing licensees or other possessors of the content to be paid a "bounty" for distribution of the content when their distribution results in the generation of license fees. In effect, ordinary users can become distributors of the content, and the rights-management infrastructure is used in a way that allows these users to be paid a portion of subsequent licensing fees for the content. In effect, the rights-management infrastructure is leveraged to recruit ordinary users to become "promoters" of the content, and allow those users to be paid according to their success at promoting licensure of the content. The technique scales well: a user could be paid a small fee (e.g., a percentage of the licensing fee for the song) for successfully referring a single user to license the content; or a user could make a business out of promoting content on a large scale and can be paid accordingly. The actual amount that a user receives for distributing the content can be expressed as a percentage of the licensing fee based on how many steps away that user is in the distribution chain from a new licensee (e.g., original content owner gets 50%, tier 1 distributor gets 15%, tier 2 distributor gets 10%, tier 3 distributor gets 5%, etc.).

Figure 1:
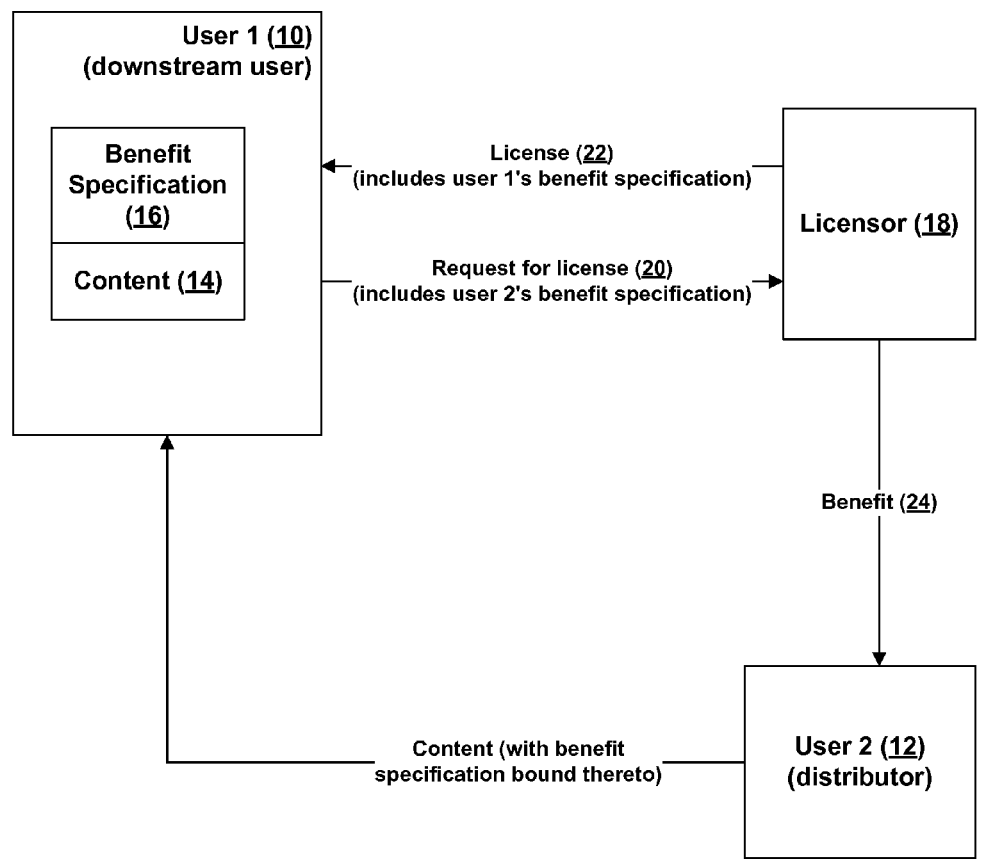
FIG. 1 is a block diagram of an exemplary environment in which distribution of content may occur.

FIG. 1 shows an exemplary environment in which distribution of content can occur. User 1 (reference numeral 10) has some rights-managed content 14 that he may obtain a license for. Content 14 may be music, video, an electronic book or other print material, software, etc., or any other type of content that is capable of being represented in a digital form. As is known in the art of digital rights management, content 14 may be encrypted, or otherwise protected, in such a way that it can only be used when appropriate permissions are granted. Typically, the user receives an electronic license to use the content, which defines the terms on which the content may be used and also contains "enabling bits"—i.e., data such as a decryption key that allows the content to be used. Rights-management software and/or hardware at user 1's site enforces the terms set forth in the license by permitting the content to be used only in accordance with the terms of a license. For example, the content may be encrypted by the license server's private key when the initial license is granted, and the rights management software (in conjunction with a rendering application such as WINDOWS MEDIA PLAYER) can decrypt this content using the server's public key—but only when it is permitted to do so by the terms of the license.

Content 14 is bound to a "benefit specification" 16. Benefit specification 16 comprises data that specifies—either explicitly or implicitly—that some third party is to receive a benefit in the event that user 1 purchases a license for content 14. Benefit specification 16 can take various forms; some of these forms are discussed below in connection with FIGS. 2-5. In one example, the name of a previous licensee (or some identifier indicative of that licensee's identity) of the content is embedded in the content, and the mere presence of this previous licensee's name implicitly specifies that this previous licensee is to receive a benefit. While this is one example of a technique for binding a benefit specification 16 to content 14, it will be understood that this technique is not limiting of the invention, and that the scenario shown in FIG. 1 may take place as long as an explicit or implicit benefit specification is somehow bound to the content.

User 1, in the example of FIG. 1, is a "downstream user." "Downstream" refers to the fact that user 1 is not the initial holder of content 14, but rather has received it from some other user. For example, user 1 may have received content 14 (and the corresponding benefit specification 16) from user 2 (reference numeral 12). As shown in FIG. 1, user 2 has transmitted to user 1 content with a benefit specification bound thereto. At the time that user 1 received this content, user 1 typically has not yet obtained a license for the content.

In a preferred embodiment of the invention, benefit specification 16 calls for user 2 to obtain a benefit if user 1 eventually purchases a license for content 14. Typically, user 2 has arranged for this benefit specification 16 to be bound to content 14 because user 2 wishes to make a profit by redistributing content. Thus, user 2 in the example of FIG. 1 has been labeled a "distributor." It should be noted that user 2 may be a distributor in the traditional commercial sense, but need not necessarily be such a person. Thus, user 2 may be a professional "middleman" engaged in the business of distributing and redistributing digital content, but user 2 may also be just an ordinary user distributing a small number of copies of content to friends or acquaintances who may be interested in such content. However, user 2 has been labeled a "distributor" in FIG. 1, since user 2 has distributed content 14 to user 1.

In order to use content 14, user 1 contacts licensor 18 to request a license. The request 20 for a license includes the benefit specification 16. According to one feature of the invention, the benefit specification 16 is preferably bound to the content in such a way as to ensure that user 1 transmits benefit specification 16 as part of license request 20. Various exemplary techniques for ensuring that benefit specification 16 is passed to the licensor are discussed below in connection with FIGS. 2-5.

After user 1 submits request 20 to licensor 18, licensor 18 enforces the conditions for licensing content 14 to user 1. A wide variety of licensing conditions are possible. For example, user 1 may be required to pay for a license, in which case licensor 18 collects this payment from user 1 (and arranges for the content owner, as well as anyone else identified in the license, to get paid). As another example, content 14 may be licensable only to a limited class of people, in which case licensor 18 determines that user 1 is in this permissible class prior to issuing the license. Assuming that the conditions for licensure have been met, licensor 18 issues license 22 to user 1. License 22 permits user 1 to use content 18. (As discussed below, in a preferred embodiment the license effectively grants to the user the right to freely share and distribute the content so that other users can license it.)

When licensor 18 issues license 22, licensor 18 also enforces benefit specification 16. As noted above, benefit specification 16 calls for user 2 to receive a benefit 24 in the event that a license is purchased for content 14. Since user 1 has purchased such a license, licensor 18 provides benefit 24 to user 2 (or arranges for this benefit to be provided).

Exemplary Benefit Specifications and the Binding Thereof to Content

It can be appreciated from the preceding discussion that the ability of the distributor (e.g., user 2 in the example of FIG. 1) to collect a benefit is based on binding a benefit specification 16 to content 14 in such a way that licensor 18 is made aware of this benefit specification as part and parcel of a downstream user's making a license request 20. FIGS. 2-5 show four exemplary ways in which a benefit can be specified and bound to the content.

Figure 2:
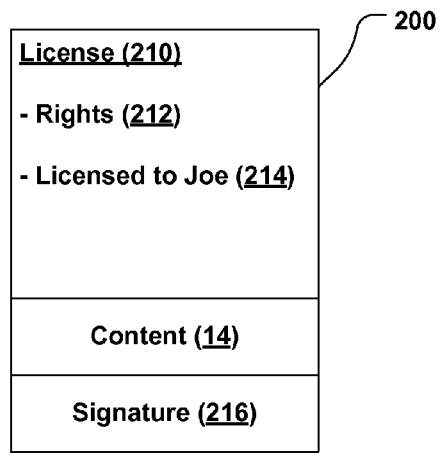
FIGS. 2-5 are block diagrams, respectively, of first, second, third, and fourth exemplary embodiments of the binding of a benefit specification to content.

FIG. 2 shows a first example of how a benefit can be bound to content. Package 200 contains both the content 14 and a license 210 to use the content. Exemplary license 210 contains rights 212, which permit a particular entity to use the content in some manner. For example, rights 212 may permit a user 210 to consume the content (e.g., play a video) six times, or for 30 days, or in perpetuity. In this example, the license names the entity 214 to whom the rights apply. In this example, that entity is a person ("Joe"), although it should be understood that content can be licensed to any type of entity (e.g., a group of individuals, a corporation, a department of a larger organization, a particular machine, etc.). Package 200 also contains a cryptographic signature 216, which allows any alteration to package 200 to be detected.

In the example of FIG. 2, the entity 214 to whom license 210 applies may, for example, be user 2 of FIG. 1. That is, user 2 ("Joe", in this example) may have obtained a license for himself to use the content. When user 2 redistributes the content in the hope of making a profit from the redistribution, he transmits to a downstream user (e.g., user 1 of FIG. 1) the entire package 200 containing both his own license and the content. User 1 is not able to use the content based on the license that has been issued to user 2 (other than, perhaps, on a trial basis, such as a single play or a 30-second preview). However, licensor 18 (shown in FIG. 1) can be configured to require that user 1 upload the rights portion of package 200 (including the benefit specification) as a condition for issuing a license for user 1 to consume content 14. (Licensor 18 could also be configured to require that user 1 upload the entire package 200; however, this may be inefficient since it requires a large amount of data to be transferred to the licensee that is not technically necessary in order for the licensing transaction to take place.) Licensor 18 can determine whether any portion of the package has been altered or removed by verifying signature 216. Thus, when user 1 purchases a license for the content, licensor will know that a benefit should be paid to "Joe," since Joe's name appears in license 210 that is transmitted as part of the license request. If Joe's name had somehow been removed from package 200, licensor 18 would be able to detect this removal through verification of signature 216. (Joe may not actually get paid at the time of the licensing transaction; rather, the licensor may log what licensing transactions have taken place and who should be paid, and thus may be able to make these payments intermittently based on the logs.)

Figure 3:
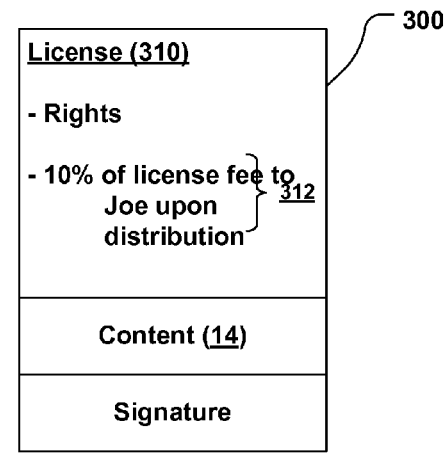

In FIG. 2, the benefit specification is implicit—that is, there is no data that explicitly describes the benefit that Joe will receive, but rather Joe's right to receive a benefit is implied from the inclusion of his name in license 210. (The licensor may, somewhere, maintain explicit rule information about how much of a benefit is to be paid depending on what "tier level" the distributor is in the distribution chain, but this rule need not explicitly appear in the license.) FIG. 3, by contrast, shows an example of an explicit benefit. In FIG. 3, package 300 contains content 14, a license 310, and a signature that prevents package 300 from being modified without authorization. License 310 contains rights to the content (e.g., Joe's rights), and also contains an explicit benefit specification 312. Benefit specification 312 states that "Joe" is to receive 10% of a future license fee, in the event that someone to whom Joe has distributed package 300 eventually purchases a license for the content contained therein.

Figure 4:
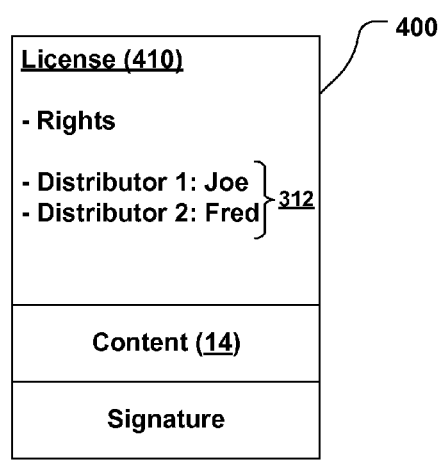

FIG. 4 shows another exemplary package 400. Package 400 contains a license 410, content 14 and a signature that prevents unauthorized modification of package 400. License 410 contains rights in the content, and also contains a list 412 of distributors. List 412 indicates, in this example, that Joe and Fred have participated in the distribution of package 400. For example, Fred may have been the original licensee of the content, and Joe may have subsequently obtained the content from Fred and then purchased his own license. Thus, package 400 is Joe's copy of content 14 (with a license for Joe to use that content), but the license notes the "chain" of distribution through which Joe received it. Thus, when Joe redistributes package 400 to another user, that package will note that the package came to that user through a chain that includes both Joe and Fred. FIG. 4 is another example of an implicit benefit specification, since license 410 contains no explicit description of the benefits to which Joe and Fred are entitled upon licensure. However, a benefit may be implied from the fact that Joe and Fred are both in the chain of distribution of the content. For example, the licensor may maintain a policy of paying the most recent distributor of the content 10% of the licensing fee, and the next most recent distributor of the content 5% of the licensing fee.

Figure 5:
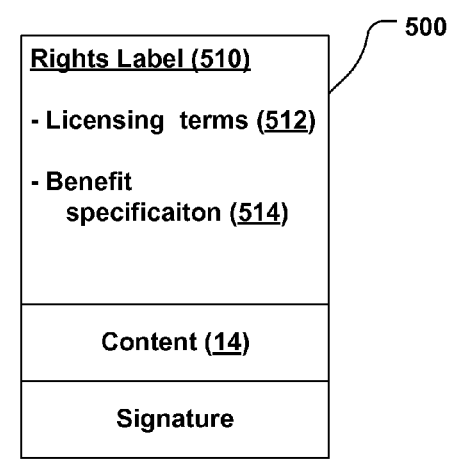

FIG. 5 shows a package 500. Package 500 contains content 14, but, instead of containing a license, package 500 contains a rights label 510. Rights label 510 is preferably not a license to use content 14, but may describe the terms on which content 14 may be licensed (e.g., content 14 may be licensed to Joe or Fred upon payment of a $5 licensing fee). Rights label 510 may also contain a benefit specification 514. As described above in connection with FIGS. 2-4, benefit specification 514 may be explicit (e.g., a statement of the benefit that a particular distributor it to receive when a license is purchased), or implicit (e.g., the name of user who have handled the content and redistributed it, where it is understood by the licensor that such named user are to receive a benefit). In one example, the entire package 500 is sent up to the licensor when a license is requested for content 14, so that the licensor can evaluate the licensing terms 512 and see what benefits have been associated with the content. Even though package 500 contains no license per se, benefit specification 514 is still bound to content 14 by way of the signature contained in package 500, since this signature allows any modification to package 500 to be detected by the licensor, and the licensor can refuse to license the content if package 500 has been modified in any way (e.g., by a nefarious user who has attempted to remove benefit specification 514 in order to deny a rightfully earned benefit to one of the distributors).

Scheme for Distribution and Redistribution of Content

Figure 6:
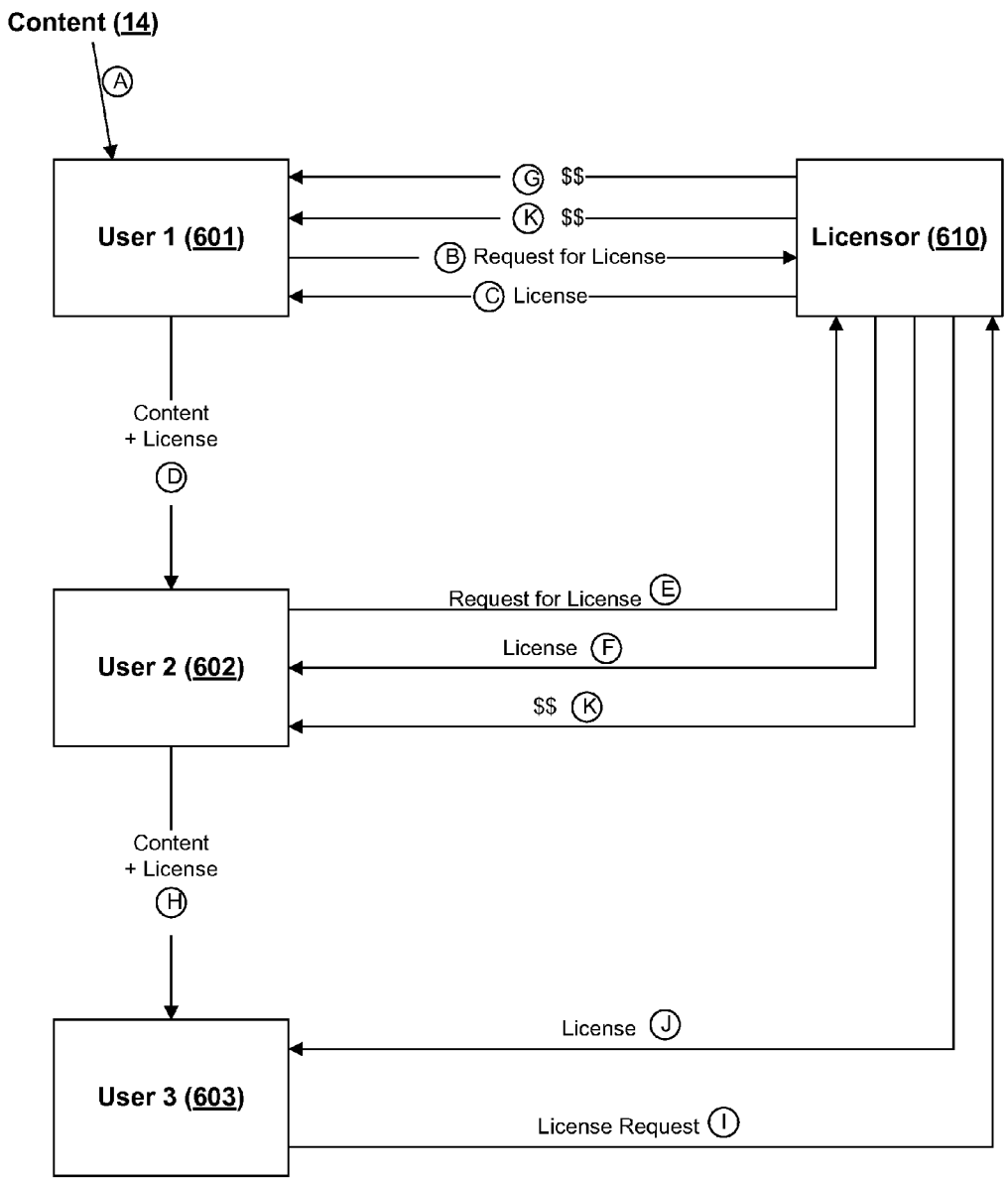
FIG. 6 is a block diagram of participants in a distribution scheme in accordance with the invention, showing a sequence of transactions that take place between those participants.

FIG. 6 is a block diagram of participants in a distribution scheme in accordance with the invention, showing a sequence of transactions that take place between those participants. In FIG. 6, there are three potential licensees of content 14: user 1, user 2, and user 3 (reference numerals 601, 602, and 603, respectively). Licensor 610 dispenses licenses for content 14. These users and the licensor participate in the distribution and licensure of content 14. The following is a description of an example of how content moves from user to user, and the various transactions that take place during that movement.

Initially (at step A), content 14 is received by user 1. (In FIG. 6, the letters in circles represent transactions in a time sequence; thus, the transaction represented by the circled A preferably happens first, the transaction represented by step B preferably happens second, etc.). When licensee 1 receives the content, he has no license to consume that content, so he contacts licensor 610 to request a license (step B). As discussed above, this request typically comprises sending the licensor a package, such as one of the packages shown in FIGS. 2-5. Licensor 610 then determines that the conditions have been met for issuing a license to user 1. For example, licensor 610 may require payment of a licensing fee as a condition for issuing a license. Once the conditions for licensure have been met, licensor 610 transmits a license to user 1 (step C).

At some subsequent point in time, user 1 decides to redistribute the content that he has licensed, so he transmits the content to a second user—user 2, in this example. Typically, user 1 transmits the content in the form of a package (such as those described in connection with FIGS. 2-5). The package can be distributed in any manner appropriate for the distribution of electronic digital information—e.g., floppy disk or other removable storage media, E-mail, peer-to-peer network, etc. This package, as discussed above, is bound in some way to user 1's identity, or perhaps to an explicit description of a benefit that user 1 is supposed to received for redistributing the content. After user 2 receives the package, if user 2 decides to purchase a license for the content contained therein, he contacts licensor 610 with a request for a license (step E). The request includes the content plus whatever information was bound to it. As discussed above, this information specifies that user 1 is to receive a benefit in the event that user 2 licenses a copy of the content that user 1 has distributed to user 2. Licensor 610 determines that conditions have been satisfied for issuing a license to user 2. In particular, licensor 610 typically demands the payment of money from user 2 for the license. Assuming these conditions are met, licensor 610 transmits a license to user 2 (step F). Because user 2 has purchased a license based on a copy of the content that was received from user 1, licensor 610 also pays a benefit to user 1 (or arranges for such a benefit to be paid) in accordance with the benefit that was bound to the copy of the content that user 2 received from user 1. By way of example, this benefit is represented in FIG. 6 as dollars flowing from licensor 610 to user 1 (step G).

Distribution of content can be an arbitrary number of levels "deep." That is, once user 2 has received and licensed the content, distribution of the content need not stop with user 2; rather user 2 can also become a distributor of the content. Thus, in the example of FIG. 6, user 2 further redistributes his copy of the content to user 3 (step H). The copy of the content that user 2 distributes, however, will also have bound to it benefit information that specifies that user 2 is supposed to receive a benefit if another user subsequently purchases a license for the content. (As before, user 2 distributes a package containing the content, such as the exemplary packages shown in FIGS. 2-5.) User 3 may then request a license from licensor 610, which may include paying money for the license (step I). Licensor 610 may then issue a license to user 3 (step J). Once the license is issued, licensor 610 may pay (or arrange to be paid) benefits to the appropriate parties. In the example of FIG. 6, users 1 and 2 are both entitled to receive some benefit since they are both in the chain of distribution that led to user 3, and thus FIG. 6 shows dollars flowing to both users 1 and 2 (steps K). However, it will be understood that the benefit payment policy need not reach all the way back to the original possessor of the content; rather, a benefit payment policy can be fashioned in any manner. For example, the policy might say that only the most recent distributor gets paid, or that only the two (or three, or four, etc.) most recent distributors get paid, or that any distributor can bind arbitrary benefit payment rules to his copy of the content, which will apply to any copy of the content whose distribution chain extends back to that user. The policies for benefit payment can be fashioned to accommodate any business model.

Process of Distributing and Redistributing Content

Figure 7:
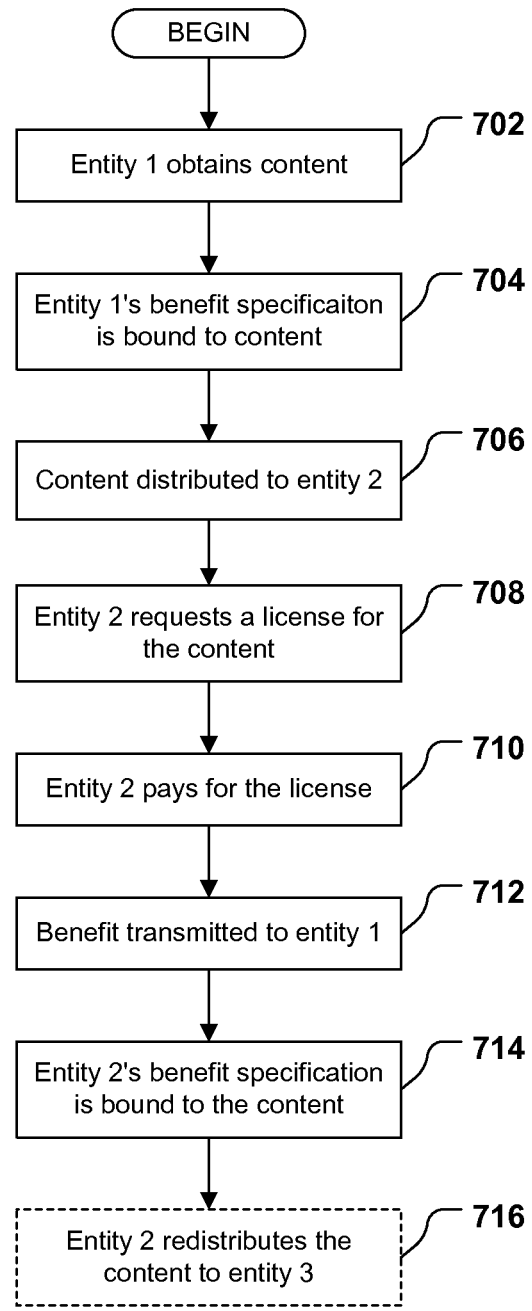
FIG. 7 is a flow diagram showing a process of distributing and redistributing content in accordance with the invention.

FIG. 7 is a diagram showing the process of distributing and redistributing content in flowchart form.

At step 702, a first entity ("entity 1") obtains content. At step 704, a benefit specification is bound to the content that entitles entity 1 to obtain a benefit in the event that a subsequent user licenses a copy that entity 1 has distributed to that user. As discussed above, this benefit specification may be either implicit (e.g., entity 1's name is bound to the content), or explicit (a description of the benefit payment rules may be bound to the content). Moreover, as further discussed above, this implicit or explicit benefit specification may be bound to the content in any manner. FIGS. 2-5 show examples of a signed package that contains the implicit or explicit benefit specification as part of a license or rights label, although it will be understood that FIGS. 2-5 are not exhaustive examples of such binding. Binding of entity 1's benefit may, in fact, take place at the time that entity 1 obtains a license for himself to use the content; some business models may require that entity 1 license the content for himself as a condition to being able to bind his benefit to the content, although it will be understood that the invention is not limited to such a business model. Thus, while step 704 may take place at the time that entity 1 obtains a license for the content, step 704 is not synonymous with such a licensing event. For example, a business model could allow an entity to register as a distributor and bind a benefit for himself to the content, even if that entity does not wish to purchase a license in the content for himself.

At step 706, entity 1 distributes the content, with the benefit specification bound thereto, to a second entity ("entity 2"). At step 708, entity 2 obtains a license of the content. As discussed above in connection with FIG. 6, there may be some conditions that must be met for entity 2's obtaining a license, including the collection of a licensing fee from entity 2. Thus, at step 710, entity 2 pays for the license. When payment is received from entity 2, a benefit is transmitted to entity 1 (step 712), in accordance with the benefit specification that has been bound to the copy of the content that entity 1 distributed to entity 2. (As noted above, the benefit may not be transmitted at the time of the licensing transaction. The licensor may store these transactions and pay users periodically. As another example, the licensor may keep an account that a user may use to purchase future licenses (and the user could "cash out" of this account at any time). At the time that entity 2 obtains a license, a benefit specification that allows entity 2 to receive a benefit (if entity 2 should further redistribute the content) may be bound to entity 2's copy of the content (step 714). Entity 2 may then (optionally) redistribute the content to entity 3 (step 716). The process of licensing the content to a new entity, binding that new entity's benefit to the content, and redistributing the content may be continued an arbitrary number of times through an arbitrary number of entities (e.g., entity 4, entity 5, etc.).

Thus, the foregoing describes an environment in which any user may be engaged to participate in the distribution of a piece of valuable content, and may be remunerated for his efforts. In some cases, the ability to enlist ordinary consumers in the distribution process may allow content creators to distribute their works without a commercial publisher, thereby allowing those content creators to reap a greater percentage of the licensing fees.

Exemplary Computing Environment

Inasmuch as the above-described invention relates to computing, FIG. 8 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 8, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during startup, is typically stored in ROM 131. RAM 132 typically contains data and/or program modules that are immediately accessible to and/or presently being operated on by processing unit 120. By way of example, and not limitation, FIG. 8 illustrates operating system 134, application programs 135, other program modules 136, and program data 137.

The computer 110 may also include other removable/non-removable, volatile/nonvolatile computer storage media. By way of example only, FIG. 8 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 8, provide storage of computer readable instructions, data structures, program modules and other data for the computer 110. In FIG. 8, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 8. The logical connections depicted in FIG. 8 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 8 illustrates remote application programs 185 as residing on memory device 181. It will be appreciated that the network connections shown are exemplary and other means of establishing a communications link between the computers may be used.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A physical computer-readable medium having computer-executable instructions that when executed by a processor cause the processor to effectuate operations comprising:
   defining a benefit specification that specifies a bounty payable by a licensor entity to a first licensee entity for promoting and distributing a piece of digital content;
   providing a package comprising the benefit specification bound to the piece of digital content such that the benefit specification and the content are provided together, the package configured for transmitting to the licensor entity as part of a license request; and
   transmitting to the first licensee entity, the package indicating to the first licensee entity, that the bounty is payable upon successful completion of a licensing transaction between the licensor entity and a second licensee entity that has received the package from the first licensee entity.

2. The physical computer-readable medium of claim 1, wherein the bounty is specified in a form other than money.

3. The physical computer-readable medium of claim 1, wherein the bounty is a percentage of a cost of a user license.

4. The physical computer-readable medium of claim 1, wherein the binding is carried out, at least in part, in response to receiving, from the first licensee entity, a request for a user license for the first licensee entity to use the piece of digital content.

5. The physical computer-readable medium of claim 4, wherein the binding is carried out, in further part, after ensuring that the first licensee entity satisfies at least one condition comprising payment of a licensing fee for the user license.

6. The physical computer-readable medium of claim 4, further comprising:
   issuing, to the first licensee entity, the user license for the piece of digital content, wherein the user license includes the benefit specification.

7. The physical computer-readable medium of claim 1, wherein the benefit specification further indicates a commission payable by the licensor entity to the first licensee entity on one or more licenses sold for the piece of digital content, the commission being dependent upon a chain of referral between the first licensee entity and a purchaser of a given license.

8. A method comprising:
   defining a benefit specification that indicates a bounty payable by a licensor entity to a first licensee entity for promoting and distributing a piece of digital content;
   generating, by a processor, a package comprising the benefit specification bound to the piece of digital content, the package configured for transmitting to the licensor entity as part of a license request, such that the benefit specification and the content are transmitted together; and
   transmitting to the first licensee entity, the package indicating to the first licensee entity, that the bounty is payable upon successful completion of a licensing transaction between the licensor entity and a second licensee entity that has received the package from the first licensee entity.

9. The method of claim 8, wherein the bounty is non-monetary.

10. The method of claim 8, wherein the binding is carried out, at least in part, in response to receiving, from the first licensee entity, a request for a user license for the first licensee entity to use the piece of digital content.

11. The method of claim 10, wherein the binding is carried out after ensuring that the first licensee entity satisfies at least one condition comprising payment of a licensing fee for the user license.

12. The method of claim 10, further comprising:
   issuing, to the first licensee entity, the user license for the piece of digital content, wherein the user license includes the benefit specification.

13. The method of claim 8, wherein the benefit specification further indicates a commission payable by the licensor entity to the first licensee entity on one or more licenses sold for the piece of digital content, the commission being dependent upon a chain of referral between the first licensee entity and a purchaser of a given license.

14. A processor comprising:
   circuitry configured to generate a benefit specification that stipulates a referral fee payable by a licensor entity to a first licensee entity for promoting and distributing a piece of digital content;
   circuitry for providing a package comprising the benefit specification bound to the piece of digital content such that the benefit specification and the content are provided together, the package configured for transmitting to the licensor entity as part of a license request; and circuitry for transmitting to the first licensee entity, the package that provides an awareness of the benefit to the first licensee entity.

15. The processor of claim 14, wherein the binding is carried out, at least in part, in response to receiving, from the first licensee entity, a request for a user license for the first licensee entity to use the piece of digital content.

16. The processor of claim 15, wherein the binding is carried out after ensuring that the first licensee entity satisfies at least one condition comprising payment of a licensing fee for the user license.

17. The processor of claim 14, the circuitry further configured to:
   issue, to the first licensee entity, the user license for the piece of digital content, wherein the user license includes the benefit specification.

18. The processor of claim 14, wherein the benefit specification further indicates a commission payable by the licensor entity to the first licensee entity on one or more licenses sold for the piece of digital content, the commission being dependent upon a chain of referral between the first licensee entity and a purchaser of a given license.

* * * * *